US010896165B2

(12) United States Patent
Horii et al.

(10) Patent No.: US 10,896,165 B2
(45) Date of Patent: Jan. 19, 2021

(54) MANAGEMENT OF SNAPSHOT IN BLOCKCHAIN

(71) Applicant: INTERNATIONAL BUSINESS MACHINES CORPORATION, Armonk, NY (US)

(72) Inventors: Hiroshi Horii, Tokyo (JP); Kohichi Kamijoh, Kanagawa (JP); Kiyokuni Kawachiya, Kanagawa (JP); Shohei Ohsawa, Tokyo (JP); Hironori Takeuchi, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 215 days.

(21) Appl. No.: 15/585,913

(22) Filed: May 3, 2017

(65) Prior Publication Data

US 2018/0322160 A1    Nov. 8, 2018

(51) Int. Cl.
*G06F 16/23* (2019.01)
*G06F 16/11* (2019.01)
*G06F 16/21* (2019.01)

(52) U.S. Cl.
CPC ........ *G06F 16/2358* (2019.01); *G06F 16/128* (2019.01); *G06F 16/219* (2019.01); *G06F 16/2365* (2019.01); *G06F 16/2379* (2019.01); *G06F 2201/84* (2013.01)

(58) Field of Classification Search
CPC ............. G06F 16/2358; G06F 16/2379; G06F 16/2365; G06F 16/128; G06F 11/1451; G06F 2201/84
See application file for complete search history.

(56) References Cited

U.S. PATENT DOCUMENTS

| 8,768,977 B2* | 7/2014 | Golab | G06F 16/219 |
| | | | 707/806 |
| 10,078,555 B1* | 9/2018 | Kumar | G06F 16/188 |
| 10,216,612 B1* | 2/2019 | Hancy | G06F 9/5077 |
| 2003/0158861 A1* | 8/2003 | Sawdon | G06F 11/1435 |

(Continued)

FOREIGN PATENT DOCUMENTS

CN    106055597 A    10/2016

OTHER PUBLICATIONS

Maesa, D, et al., Uncovering the Bitcoin Blockchain: An Analysis of the Full Users Graph, 2016 IEEE International Conference on Data Science and Advanced Analytics (DSAA), pp. 537-546 (Year: 2016).*

(Continued)

*Primary Examiner* — James Trujillo
*Assistant Examiner* — Michal Bogacki
(74) *Attorney, Agent, or Firm* — Tutunjian & Bitetto, P.C.; Randall Bluestone

(57) ABSTRACT

Verified snapshots are generated by obtaining, from one of a plurality of first nodes, a difference between a common data at a first time point and the common data at a second time point that is different from the first time point, generating a first snapshot of the common data at the first time point based on the difference, obtaining a hash of the common data at the first time point from one of the plurality of first nodes, and verifying the first snapshot at the first time point with the hash of the common data at the first time point.

16 Claims, 8 Drawing Sheets

(56) References Cited

U.S. PATENT DOCUMENTS

| | | | |
|---|---|---|---|
| 2010/0076934 A1* | 3/2010 | Pershin | G06F 11/1451 |
| | | | 707/640 |
| 2010/0114832 A1* | 5/2010 | Lillibridge | G06F 16/128 |
| | | | 707/649 |
| 2013/0085988 A1* | 4/2013 | Hiraguchi | G06F 16/2365 |
| | | | 707/609 |
| 2014/0222772 A1* | 8/2014 | Peleg | G06F 3/0671 |
| | | | 707/703 |
| 2015/0234712 A1 | 8/2015 | Fei et al. | |
| 2015/0379510 A1 | 12/2015 | Smith | |
| 2016/0202927 A1* | 7/2016 | Klarakis | G06F 3/0619 |
| | | | 709/217 |
| 2016/0292672 A1 | 10/2016 | Fay et al. | |
| 2016/0342588 A1 | 11/2016 | Judd | |
| 2017/0163733 A1 | 6/2017 | Grefen et al. | |
| 2017/0236120 A1 | 8/2017 | Herlihy et al. | |
| 2017/0264684 A1* | 9/2017 | Spillane | H04L 67/1095 |
| 2017/0316391 A1 | 11/2017 | Peikert et al. | |
| 2017/0330174 A1* | 11/2017 | Demarinis | G06Q 40/04 |
| 2017/0344987 A1* | 11/2017 | Davis | H04L 63/06 |
| 2017/0357009 A1* | 12/2017 | Raab | G01S 19/215 |
| 2017/0364552 A1* | 12/2017 | Pattanaik | H04L 9/3297 |
| 2018/0025181 A1* | 1/2018 | Barinov | G06F 21/645 |
| | | | 726/26 |
| 2018/0089041 A1* | 3/2018 | Smith | G06F 11/1474 |
| 2018/0189312 A1 | 7/2018 | Alas et al. | |

OTHER PUBLICATIONS

Van Der Horst, L, et al., Process Memory Investigation of the Bitcoin Clients Electrum and Bitcoin Core, IEEE Access, vol. 5, pp. 22385-22398 (Year: 2017).*

Chang, T, Svetinovic, D, Data Analysis of Digital Currency Networks: Namecoin Case Study, 2016 International Conference on Engineering of Complex Computer Systems, pp. 122-125 (Year: 2016).*

Daza, V, et al., CONNECT: CONtextual NamE disCovery for blockchain-based services in the IoT, IEEE ICC 2017 SAC Symposium Internet of Things Track, May 1, 2017, pp. 1-6 (Year: 2017).*

International Search Report issued in PCT/IB2017/057695 dated Mar. 27, 2018, 9 pages.

Joseph Krug et al., Sidecoin: A Snapshot Mechanism for Bootstrapping a Blockchain, https://arxiv.org/abs/1501.01039, Jan. 5, 2015, pp. 1-3.

Muneeb Ali et al., Blockstack: A Global Naming and Storage System Secured by Blockchains, The Proceedings of the 2016 USENIX Annual Techincal Conference (USENIX ATC '16), Jun. 22-24, 2016, pp. 181-194, USENIX Association.

Office Action in corresponding matter with U.S. Appl. No. 15/800,766 dated Dec. 12, 2019, 28 pages.

* cited by examiner

MANAGEMENT OF SNAPSHOT IN BLOCKCHAIN

BACKGROUND

Technical Field

The present invention relates to management of snapshot in blockchain.

Description of the Related Art

In some blockchain implementations, nodes of blockchain fabric each have an identical copy of a common set of data (sometimes referred to as a "world state" or "ledger", etc.). For example, when there are N nodes in the blockchain fabric, N nodes have N copies of the common data in a respective database.

In some cases, an auditor may need to confirm the accuracy and adequacy of transactions. The auditor may need to access the common set of data at a variety of time points in the process of confirmation. However, current methods for obtaining a common set of data at specified time points have drawbacks in that they require many computational resources.

SUMMARY

In accordance with an embodiment of the present invention, a computer program product includes instructions embodied on a non-transitory computer-readable medium or programmable circuitry, the instructions executable by a processor or the programmable circuitry, respectively, to cause the processor or the programmable circuitry to perform operations including obtaining, from at least one of a plurality of first nodes, a difference between a common data at a first time point and the common data at a second time point that is different from the first time point, generating a first snapshot of the common data at the first time point based on the difference, obtaining a hash of the common data at the first time point from at least one of the plurality of first nodes, and verifying the first snapshot at the first time point with the hash of the common data at the first time point. In an embodiment, a snapshot node may generate a correct snapshot of a first time point with less computational resources.

According to an embodiment of the present invention, the operations further include storing a plurality of snapshots of the common data at different time points. The snapshot node can store an archival record of the common data.

In accordance with an embodiment of the present invention, the operations further include determining whether a plurality of hashes of common data at the first time point are the same, wherein the obtaining the hash of the common data at the first time point from the at least one of the plurality of first nodes includes obtaining the plurality of hashes of the common data at the first time point from two or more of the first nodes. According to an embodiment, the snapshot node can use the preliminarily verified hash for verifying a newly generated snapshot.

According to an embodiment, a snapshot node comprises a computer program product, a system comprising the snapshot node and the plurality of first nodes, and a method performed by the snapshot node or system.

According to an embodiment of the present invention, a computer program product includes instructions embodied on a non-transitory computer-readable medium or programmable circuitry, the instructions executable by a processor or the programmable circuitry, respectively, to cause the processor or the programmable circuitry to perform operations including receiving a snapshot of a first time point from a snapshot node, calculating a hash of the snapshot of the first time point, receiving a hash of a common data at the first time point from at least one of a plurality of first nodes, the common data being stored in the plurality of first nodes, and determining whether the hash of the snapshot of the first time point is the same as the hash of the common data at the first time point. According to an embodiment, an auditor node can confirm the accuracy of a snapshot received from the snapshot node with a hash received from the first nodes.

According to an embodiment of the present invention, the operations further include receiving at least one common transaction between the first time point and a second time point from the at least one of the plurality of first nodes, and generating the common data at the second time point based on the snapshot of the common data at the first time point and the at least one common transaction in response to determining that the hash of the snapshot of the first time point is the same as the hash of the common data at the first time point. According to an embodiment, the auditor node can accurately restore the common data of any time point with less computational resources.

According to an embodiment, an auditor node includes a computer program product, a system comprising the auditor node and the plurality of first nodes, and a method performed by the auditor node or system.

The summary clause does not necessarily describe all features of the embodiments of the present invention. Embodiments of the present invention may also include sub-combinations of the features described above.

BRIEF DESCRIPTION OF THE DRAWINGS

The following description will provide details of preferred embodiments with reference to the following figures wherein.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
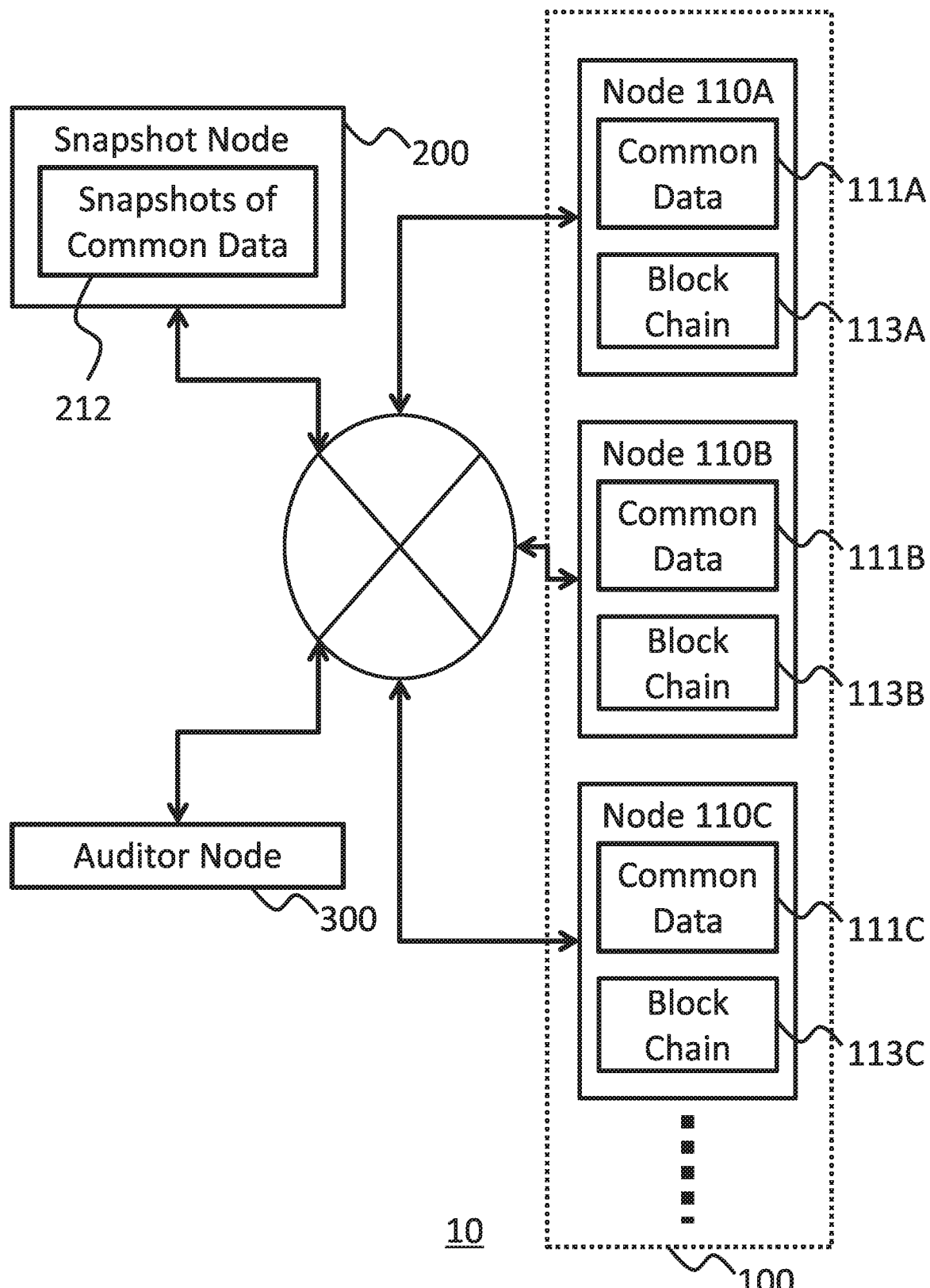
FIG. 1 shows an exemplary configuration of a system, according to an embodiment of the present invention.

FIG. 1 shows an exemplary configuration of a system 10, according to an embodiment of the present invention. The system 10 as a whole may be a distributed database, such as Blockchain, where a plurality of nodes can maintain a common data, process a transaction, and grow a blockchain.

Although the system 10 may perform Hyperledger, among a number of Blockchain technologies, in the following embodiments, the system 10 can also perform other Blockchain technologies. A number of implementations adopted for Hyperledger and other Blockchain technologies may be used for the embodiments explained below. The system 10 includes a first node pool 100, a snapshot node 200, and an auditor node 300.

The first node pool 100 can store a common transaction and update a common data with the common transaction. The first node pool 100 may comprise a plurality of first nodes, such as a first node 110A, a first node 110B, and a first node 110C, as shown in FIG. 1. The first node pool 100 may perform Blockchain. In an embodiment, the first nodes 110A-110C may perform a distributed consensus algorithm to process common transactions.

The first nodes 110A-110C may each perform as a validating peer or a non-validating peer in Hyperledger. Each of the first nodes 110A-110C may comprise memory to store the respective common data and blockchain.

The snapshot node 200 may comprise memory to store a plurality of snapshots of the common data 212 at different time points. The snapshot is a copy of the common data at a time point. As such, the snapshot node 200 can store copies of the common data at various time points.

The auditor node 300 can obtain the common data at specific time points for an audit. The first nodes 110A-110C, the snapshot node 200, and the auditor node 300 may be implemented by computers and databases.

The first nodes 110A-110C, the snapshot node 200, and the auditor node 300 can communicate with each other via a network, such as the internet. Details of the first node 110A-110C, the snapshot node 200, and the auditor node 300 are explained in relation to FIGS. 2-4.

In an embodiment, the snapshot node 200 and/or the auditor node 300 can be implemented as different nodes from the first nodes 100. In an embodiment, a portion of the first nodes 100 may at least partially perform as the snapshot node 200 and/or the auditor node 300.

Figure 2:
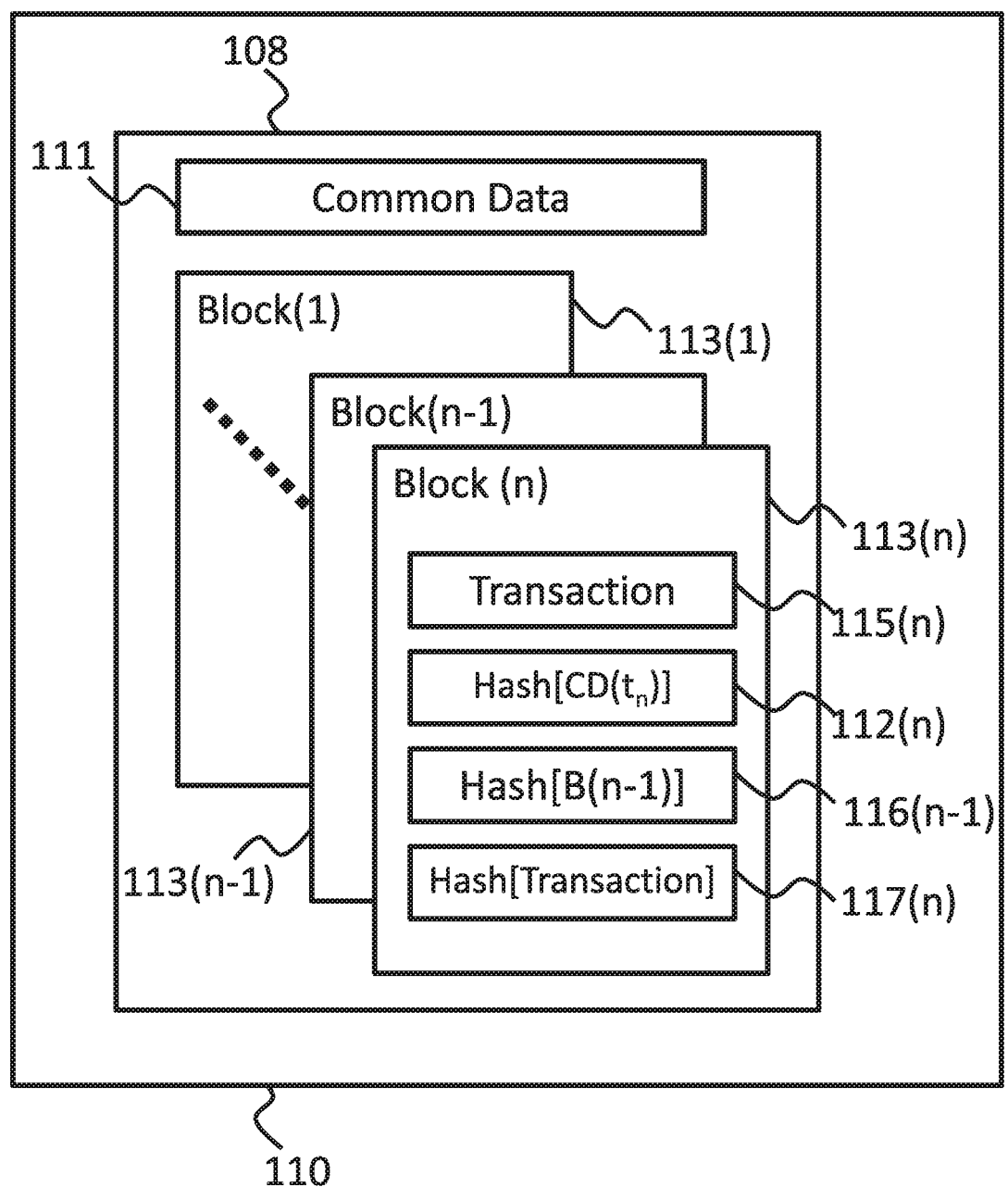
FIG. 2 shows an exemplary data stored in a first node of the system, according to an embodiment of the present invention.

FIG. 2 shows exemplary data stored in a first node 110 of the system 10, according to an embodiment of the present invention. A first node 110 (which may represent one of the first nodes 110A-110C in FIG. 1) may operate as a node device of Blockchain fabric.

The first nodes 110A-110C may comprise a processor and/or a programmable circuitry and one or more non-statutory computer readable storage mediums collectively including instructions. The processor and/or the programmable circuitry may execute instructions to perform various operations. The processor may perform the instructions stored in the computer readable storage mediums. The programmable circuitry may perform instructions programmed in it. In an embodiment, the computer-readable medium or the programmable circuitry may be provided as the computer program product.

In an embodiment, the first node 110 may store a current common data 111 and a hash of the current common data 112 in its memory 108.

The first node 110 may also store a plurality of blocks 113(1)-113($n$) as the blockchain in the memory 108. Each block may contain transaction(s) 115, a hash 117 of the transaction(s) 115, a hash of a previous block 116, and a hash of the common data 112 at a time when the block is generated. For example, Block ($n$) 113($n$) contains transaction(s) 115($n$) occurring after the previous Block (n–1) 113($n$–1) was generated, a hash 117($n$) of the transactions 115($n$), a hash of an (n–1)-th block 116($n$–1), and a hash of the common data at a time point $t_n$ when Block(n) is generated 112($n$).

In an embodiment, the first node 110 receives a transaction 115, applies a consensus algorithm to the transaction with other first nodes 110, and updates the common data 111 with the consented transaction 115 in accordance with another algorithm, such as Hyperledger. In an embodiment, the memory 108 of the first node 110 may be implemented by one or more database devices.

Figure 3:
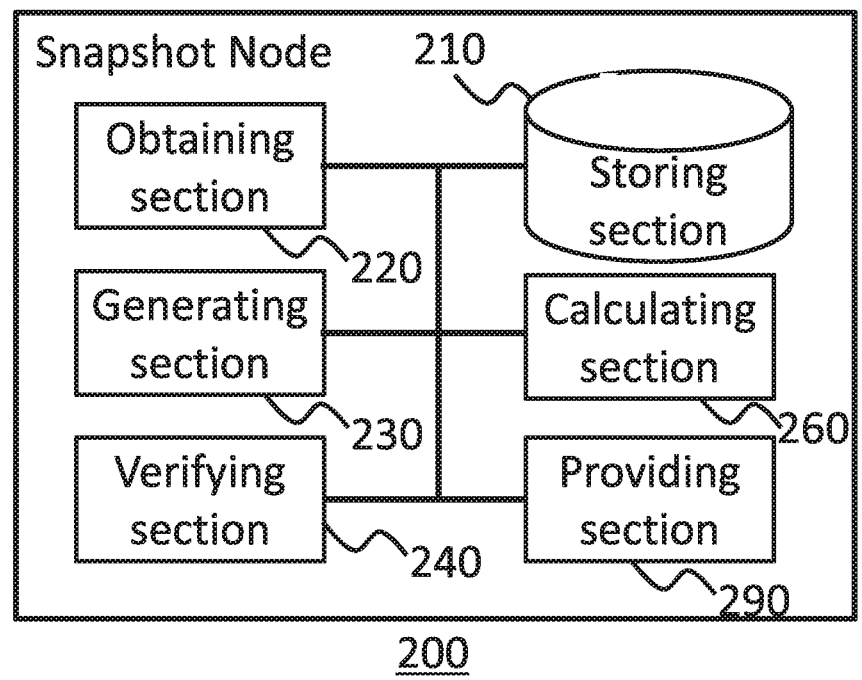
FIG. 3 shows an exemplary configuration of a snapshot node of the system, according to an embodiment of the present invention.

FIG. 3 shows an exemplary configuration of a snapshot node 200 of the system 10, according to an embodiment of the present invention.

The snapshot node 200 may include a processor and/or a programmable circuitry and one or more computer readable mediums collectively including instructions. The instructions, when executed by the processor or programmable circuitry, may cause the processor or the programmable circuitry to operate as a plurality of operating sections. Thereby, the snapshot node 200 may be represented as a storing section 210, an obtaining section 220, a generating section 230, a verifying section 240, a calculating section 260, and a providing section 290.

The storing section 210 can store a plurality of snapshots of the common data at different time points. In an embodiment, the storing section can store N snapshots of the common data at N different time points.

The storing section 210 may also store a variety of data/instructions used for operations of the snapshot node 200. One or more other elements in the snapshot node 200 (e.g., the obtaining section 220, the generating section 230, the verifying section 240, the calculating section 260, the providing section 290, etc.) may communicate data directly or via the storing section 210, as necessary. In an embodiment, the storing section 210 comprises one or more storage units for storing the snapshots, and/or, a memory for storing the variety of data/instructions.

The obtaining section 220 may obtain a hash of the common data at the first time point from the first node pool 100. In an embodiment, the obtaining section 220 may obtain the plurality of hashes of the common data at the first time point from two or more of the first nodes 110. In an embodiment, the obtaining section 220 may obtain the hash(es) of the common data from at least one or all of the plurality of the first nodes 110.

The obtaining section 220 can also obtain a difference between a common data at a first time point and the common data at a second time point that is different from the first time point, from the first node pool 100. In an embodiment, the obtaining section 220 may obtain the difference between the common data at the two time points from one or more of the plurality of first nodes 110. In an embodiment, the obtaining section 220 may obtain one or more transactions in blocks as the difference.

The generating section 230 can generate a first snapshot of the common data at the first time point based on the difference between the common data at the first time point and the common data at the second time point. The generating section 230 may generate the first snapshot further based on a second snapshot at the second time point. In an embodiment, the generating section 230 generates the first snapshot by reflecting the difference of the common data between the first time point and the second time point, to the snapshot at the second time point. The generating section 230 can store the first snapshot in the storing section 210.

The verifying section 240 verifies the first snapshot at the first time point with the hash of the common data at the first time point. In an embodiment, the verifying section 240 determines whether the hash of the first snapshot is the same as the hash of the common data at the first time point.

The verifying section 240 can further verify a plurality of hashes of the common data at the first time point obtained from the plurality of first nodes 110. In an embodiment, the verifying section 240 determines whether a plurality of hashes of common data at the first time point obtained from the first nodes 110, are the same.

The calculating section 260 calculates a hash of the first snapshot of the common data at the first time point, generated by the generating section 230.

The providing section 290 receives a request of a snapshot at a time point from the auditor node 300, retrieves the snapshot of the time point from the storing section 210, and provides the requested snapshot to the auditor node 300.

Figure 4:
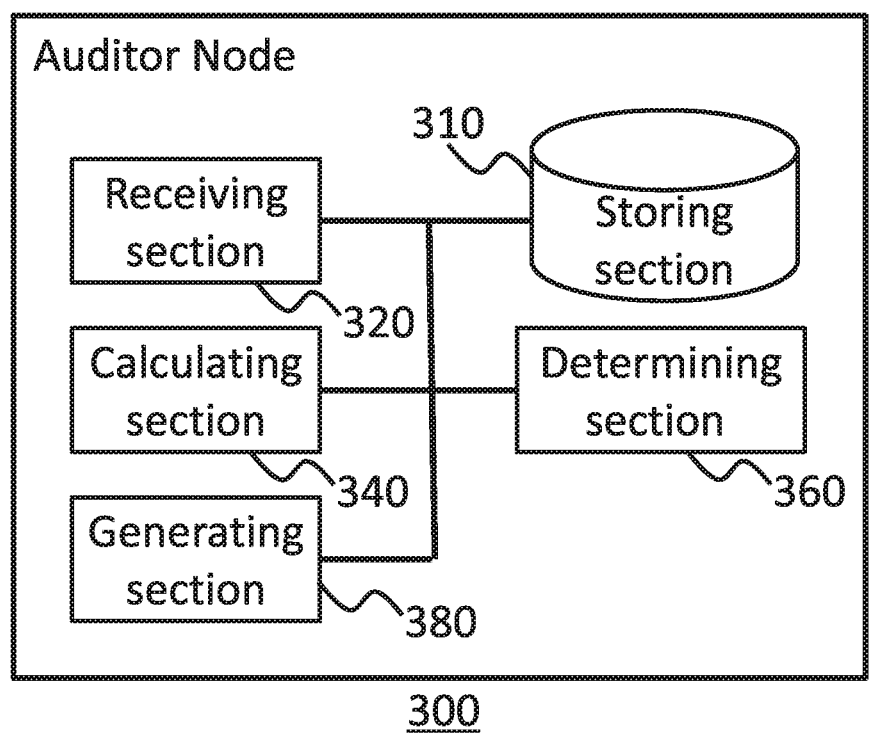
FIG. 4 shows an exemplary configuration of an auditor node of the system, according to an embodiment of the present invention.

FIG. 4 shows an exemplary configuration of an auditor node 300 of the system 10, according to an embodiment of the present invention.

The auditor node 300 may comprise a processor and/or a programmable circuitry and one or more non-transitory computer readable storage mediums collectively including instructions. The instructions, when executed by the processor or programmable circuitry, may cause the processor or the programmable circuitry to operate as a plurality of operating sections. Thereby, the auditor node 300 may be represented as a storing section 310, a receiving section 320, a calculating section 340, a determining section 360, and a generating section 380.

The storing section 310 can also store a variety of data/instructions used for operations of the auditor node 300. One or more other elements in the auditor node 300 (e.g., the receiving section 320, the calculating section 340, the determining section 360, the generating section 380, etc.) can communicate data directly or via the storing section 310, as necessary. The storing section 310 may comprise a memory for storing the variety of data/instructions.

The receiving section 320 may receive a snapshot of a third time point from a snapshot node 200. The receiving section 320 may also receive a hash of a common data at the third time point and at least one common transaction between the third time point and a fourth time point, from the at least one of the plurality of first nodes 110. In an embodiment, the receiving section 320 may receive one or more of blocks, as the hash of the common data at the third time point and the common transaction(s) between the third point and the fourth time point.

The calculating section 340 may calculate a hash of the snapshot of the third time point received from the snapshot node 200.

The determining section 360 may verify the snapshot of the third time point received from the snapshot node 200. In an embodiment, the determining section 360 determines whether the hash of the snapshot of the third time point calculated by the calculating section 340 is the same as the hash of the common data at the third time point received by the receiving section 320.

The generating section 380 generates the common data at the fourth time point based on the snapshot of the common data at the third time point and the at least one common transaction between the third time point and a fourth time point. The generating section 380 can generate the common data at the fourth time point in response to the determining section 360 determining that the hash of the snapshot of the third time point is the same as the hash of the common data at the third time point. In an embodiment, the generating section 380 may reflect the common transaction(s) to the common data at the third time point.

Figure 5:
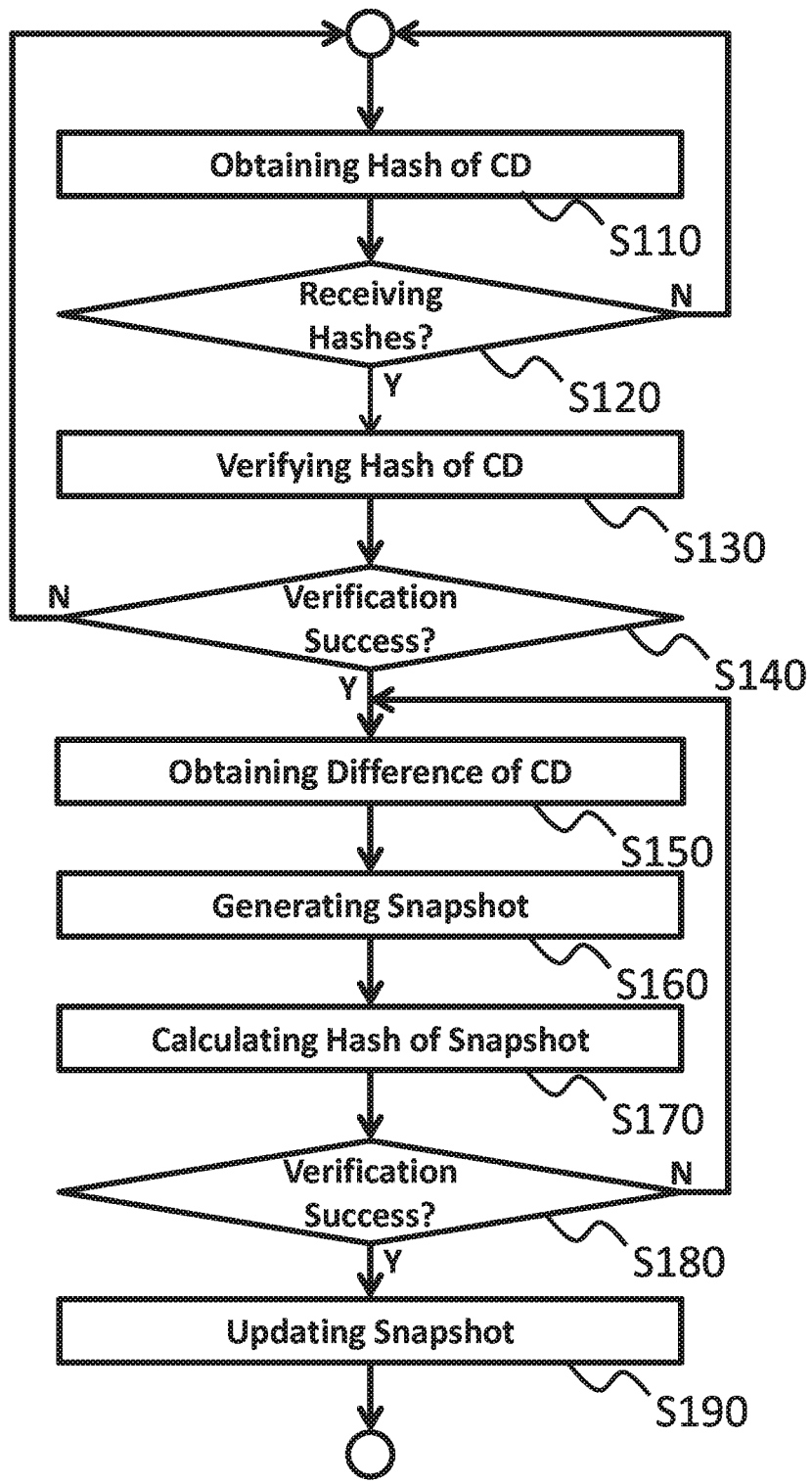
FIG. 5 shows a first operational flow according to an embodiment of the present invention.

FIG. 5 shows an operational flow according to an embodiment of the present invention. The present embodiment describes an example in which a snapshot node, such as the snapshot node 200, performs the operations from S110 to S190, as shown in FIG. 5. The snapshot node may store a new snapshot by the operations of S110-S190.

At S110, an obtaining section, such as the obtaining section 220, may obtain a hash of the common data at a time point $t_n$ from at least one first node of a first node pool such as the first node pool 100. The hash of the common data at a time point $t_x$ may be represented by "$H(CD(t_x))$" hereinafter.

The time point $t_n$ is a time point when Block(n) is generated. Block(n) may be the latest block. The time point $t_n$ may be referred to as a first time point. In an embodiment, the time point $t_n$ substantially corresponds to current time. In an embodiment, the time point $t_n$ corresponds to a time prior to the current time by a predetermined duration.

In an embodiment, the obtaining section may obtain $H(CD(t_n))$ from each of two or more of first nodes in the first node pool. In an embodiment, the obtaining section may obtain $H(CD(t_n))$ from every first node in the first node pool. In an embodiment, the obtaining section may obtain $H(CD(t_n))$ from one first node in the first node pool.

At S120, the obtaining section determines whether the obtaining section obtains $H(CD(t_n))$ from a predetermined number of the first nodes in the first node pool. In an embodiment, the predetermined number may be the number of all first nodes in the first node pool. In an embodiment, the predetermined number may be the number of a half or two-thirds (⅔) of the first nodes in the first node pool.

If the decision is positive, then the obtaining section proceeds with an operation of S130. If the decision is negative, then the obtaining section goes back to S110 to wait for further receiving $H(CD(t_n))$ from the first nodes.

At S130, a verifying section, such as the verifying section 240, verifies a plurality of hashes $H(CD(t_n))$ obtained from the first nodes at S110. In an embodiment, the verifying section determines whether all of the plurality of hashes $H(CD(t_n))$ are the same. In an embodiment, the verifying section determines whether more than a predetermined number of the plurality of hashes $H(CD(t_n))$ are the same. In the embodiment, the predetermined number may be (2M+1)/3 where M is the number of the first nodes in the first node pool.

At S140, the verifying section determines whether the verification at S130 is successful or not. If the verification is successful, then the verifying section stores the verified hash $H(CD(t_n))$ in a storing section, such as the storing section 210, and causes the obtaining section to proceed with an operation of S150. If the verification is not successful, then the verifying section goes back to the operation of S110.

At S150, the obtaining section obtains a difference $\Delta CD(t_n)$ between a common data $CD(t_n)$ at the time point $t_n$ and the common data $CD(t_{n-a})$ at a time point $t_{n-a}$ from the first node pool. The time point $t_{n-a}$ may be referred to as a second time point, and may be prior to the time point $t_n$. In an embodiment, the time point $t_{n-a}$ may correspond to a time point when Block(n−a) is generated, where a variable a may be 1 or an integer larger than 1.

In an embodiment, the difference $\Delta CD(t_n)$ is from an update of the common data at the time point $t_n$ with at least one common transaction made between the time point $t_n$ and the time point $t_{n-a}$.

In an embodiment, the obtaining section may obtain Block(n), Block(n−1), . . . , Block(n−a+1). Block(n) includes one or more transactions that have occurred after the time $t_{n-1}$ when a previous Block(n−1) has been generated, Block (n−1) includes one or more transactions that have occurred after the time $t_{n-2}$ when a Block(n−2) has been generated, . . . , Block(n−a+1) includes one or more transactions that have occurred after the time $t_{n-a}$ when a Block (n−a) has been generated.

These transaction(s) correspond to the difference between $CD(t_n)$ and $CD(t_{n-a})$. The obtaining section may obtain these transaction(s) that have occurred between the time point $t_n$ and the time point $t_{n-a}$ from Block(n), Block(n−1), . . . , Block(n−a+1), as the difference $\Delta CD(t_n)$.

In an embodiment, the obtaining section may randomly appoint one or more first node among the first node pool, and receive the difference $\Delta CD(t_n)$ from the appointed first node. In an embodiment, the obtaining section may receive the difference $\Delta CD(t_n)$ from predetermined one or more first nodes of the first node pool.

At S160, a generating section, such as the generating section 230, generates a snapshot $SS(t_n)$ at the time point $t_n$ based on the difference $\Delta CD(t_n)$ obtained at S150 and a snapshot $SS(t_{n-a})$ at the time point $t_{n-a}$. In an embodiment, the generating section may read the snapshot $SS(t_{n-a})$ from the storing section, and reflect the difference $\Delta CD(t_n)$ to the snapshot $SS(t_{n-a})$ to obtain the snapshot $SS(t_n)$.

At S170 a calculating section, such as the calculating section 260, calculates a hash $H(SS(t_n))$ of the snapshot $SS(t_n)$ generated at S160.

At S180, the verifying section verifies the snapshot $SS(t_n)$ with the verified hash $H(CD(t_n))$. In an embodiment, the verifying section may determine whether the hash $H(SS(t_n))$ calculated at S170 is the same as the hash $H(CD(t_n))$ verified at S130.

If the verifying section determines that the hash $H(SS(t_n))$ is the same as the hash $H(CD(t_n))$, then the verifying section proceeds with S190. If the verifying section determines that the hash $H(SS(t_n))$ is not the same as the hash $H(CD(t_n))$, then the verifying section goes back to S150. Then at S150, the obtaining section may again obtain the difference $\Delta CD(t_n)$ from other first node(s) in the first node pool.

At S190, the storing section stores the verified snapshot $SS(t_n)$. In an embodiment, the storing section can store the snapshot $SS(t_n)$ as the latest snapshot. In an alternative embodiment, the storing section can store the difference $\Delta CD(t_n)$ instead of/in addition to the snapshot $SS(t_n)$. In the embodiment, the snapshot node calculates a snapshot $SS(t_k)$ at any time point $t_k$ from an initial snapshot $SS(t_1)$ and $\Delta CD(t_2)$, $\Delta CD(t_3)$, . . . , $\Delta CD(t_k)$ if the snapshot node receives a request of the snapshot $SS(t_k)$ from an auditor node.

After the operation of S190, the snapshot node may again perform the operation of S110. In an embodiment, the snapshot node may periodically perform the operations of S110-S190. For example, the obtaining section may start the operation of S110 after being notified that a new Block (n+1) has been generated by one or more of the first nodes.

In an embodiment, the snapshot node may not perform the operations of S120-S140, and may obtain the hash $H(CD(t_x))$ from a single first node. In such embodiments, the first nodes may build a consensus on the hash $H(CD(t_x))$ by a consensus algorithm before sending the hash $H(CD(t_x))$ to the snapshot node. Thereby the obtaining section may obtain the hash $H(CD(t_x))$ on which a consensus is built by the plurality of first nodes.

According to the embodiments explained in relation to FIG. 5, the first nodes do not have to store snapshots of the common data, thereby reducing computational resources required by the first nodes. In addition, since the snapshot node stores snapshots after verification with hashes, the snapshot node can store genuine common data as the snapshots.

Figure 6:
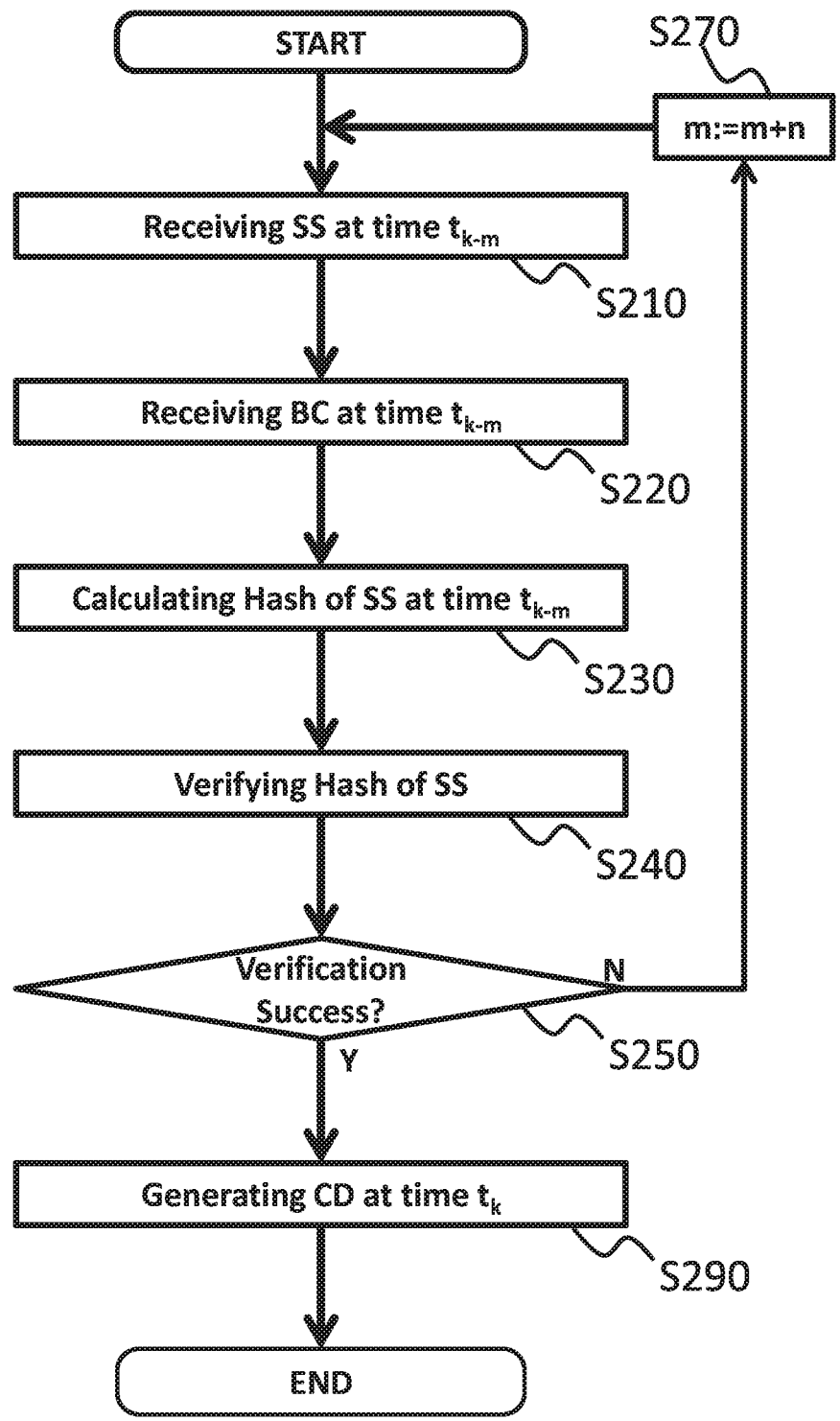
FIG. 6 shows a second operational flow according to an embodiment of the present invention.

FIG. 6 shows a second operational flow according to an embodiment of the present invention. The present embodiment describes an example in which an auditor node, such as the auditor node 300, performs the operations from S210 to S290, as shown in FIG. 5. The auditor node may obtain a common data at any time point by the operations of S210-S290.

At S210, a receiving section, such as the receiving section 320, receives a snapshot at a time point $t_{k-m}$ from the snapshot node. A time point $t_k$ is a time point of which snapshot the auditor node requires. The time point $t_{k-m}$ may be prior to the time point $t_k$. The time point $t_{k-m}$ may be referred to as a third time point and the time point $t_k$ may be referred to as a fourth time point.

In an embodiment, the time point $t_k$ is a time point when m blocks are generated after the time point $t_{k-m}$. In an embodiment, a variable m may be 1 or integer larger than 1. For example, m is initially set to 1.

In an embodiment, the receiving section transmits a request of the snapshot with information of the time point $t_k$. Then, a providing section, such as the providing section 290, in the snapshot node retrieves the snapshot $SS(t_{k-m})$ from the storing section 210, and transmits the snapshot $SS(t_{k-m})$ to the receiving section. The receiving section of the auditor node may receive the snapshot $SS(t_{k-m})$ from the providing section of the snapshot node.

At S220, the receiving section receives one or more blocks from the time point $t_{k-m}$ to $t_k$. In an embodiment, the receiving section may receive Block(k−m) at the time point $t_{k-m}$, which may include (i) one or more common transactions occurring between the time points $t_{k-m-1}$ and $t_{k-m}$ and (ii) a hash $H(CD(t_{k-m}))$ of the common data at the time point $t_{k-m}$. The receiving section may also receive Block(k−m+1), Block(k−m+2), . . . , Block(k).

In an embodiment, the receiving section may randomly appoint one first node among the first node pool, and transmit a request of blocks with information of the time point k−m to the appointed first node. The appointed first node may transmit Block(k−m), . . . , Block(k) to the auditor node, and the receiving section of the auditor node may then receive Block(k−m), . . . , Block(k). In an embodiment, the receiving section may receive Block(k−m), . . . , Block(k) from two or more of first nodes in the first node pool.

At S230, a calculating section, such as the calculating section 340, calculates a hash $H(SS(t_{k-m}))$ of the snapshot $SS(t_{k-m})$ obtained from the snapshot node at S210.

At S240, a determining section, such as the determining section 360, verifies the snapshot $SS(t_{k-m})$ obtained from the snapshot node at S210 with the block(s) obtained at S220. In an embodiment, the determining section determines whether the hash $H(SS(t_{k-m}))$ calculated at S230 is the same as the hash $H(CD(t_{k-m}))$ in Block(k−m) obtained at S220. In the embodiment, the determining section determines that the verification is successful if both of the hashes are the same, and that the verification is not successful if both of the hashes are not the same.

At S250, the determining section proceeds with S270 if the verification is not successful. The determining section proceeds with S290 if the verification is successful.

At S270, the determining section updates the variable m by adding n to m. In an embodiment, n may be 1 or an integer larger than 1. The determining section may go back to S210 with the updated m. Thereby, at the next iteration of S210, the receiving section receives a snapshot at an updated time point that is prior to the time point of which snapshot is received at the previous S210, from the snapshot node in response to determining that the hash $H(SS(t_{k-m}))$ is not the same as the hash $H(CD(t_{k-m}))$ at S250. In the embodiment, the updated time point may be referred to as a fifth time point.

At the next iteration of S220, the receiving section receives one or more blocks based on the updated time point, from at least one first node of the first nodes pool, and receives the blocks from a first node different from the first node at the previous iteration of S220.

At S290, a generating section, such as the generating section 380, generates a common data $CD(t_k)$ at the time point $t_k$ from the snapshot $SS(t_{k-m})$ at the time point $t_{k-m}$ obtained at S210 and the common transaction(s) between the time points $t_k$ and $t_{k-m}$ included in the blocks obtained at S220. In an embodiment, the generating section generates the common data $CD(t_k)$ by reflecting the common transaction(s) to the snapshot $SS(t_{k-m})$.

According to the embodiments explained in relation to FIG. 6, the auditor node may obtain a genuine common data at any time point it requires with less computational resources than current methods of common data auditing.

According to the embodiments in relation to FIG. 6, the auditor node may first obtain the snapshot $SS(t_{k-m})$ at the time point $t_{k-m}$ before the time point $t_k$ and Block (k-m), . . . , Block(k), verify the snapshot $SS(t_{t-m})$ at the time point $t_{k-m}$, and then generate the common data $CD(t_k)$ at the desired time point $t_k$.

In some alternative embodiments, the auditor node can generate the common data at a time point from a snapshot at a later time point, instead of a snapshot at a previous time point. In an alternative embodiment, the auditor node can first obtain the snapshot $SS(t_{k+m})$ at the time point $t_{k+m}$, which is posterior to the time point $t_k$, and a single Block (k+m) at the time point $t_{k+m}$. The Block(k+m) may include a hash $H(CD(t_{k+m}))$ of the common data at the time point $t_{k+m}$ and one or more transactions between the time points $t_k$ and $t_{k+m}$. The auditor node may verify the snapshot $SS(t_{k+m})$ with the $H(CD(t_{k+m}))$ in Block(k+m). Then, the auditor node may generate the common data $CD(t_k)$ at the time point $t_k$ by undoing the transaction(s) between $t_k$ and $t_{k+m}$ from the snapshot $SS(t_{k+m})$. According to the embodiment, the auditor node may minimize the number of blocks obtained at S220.

In the alternative embodiment, when the determining section determines that the hash $H(SS(t_{k-m}))$ is not the same as the hash $H(CD(t_{k-m}))$ at S250, the receiving section may, at a later iteration of S210, receive a snapshot at an updated time point that is prior to the time point $t_{k-m}$ from the snapshot node. In the embodiment, the updated time point may be referred to as a sixth time point. At the later iteration of S220, the receiving section may also receive a block (including a hash and transaction(s)) of the common data at the updated time point from at least one first node of the first nodes pool.

In a further alternative embodiment, the auditor node may first obtain the snapshot $SS(t_{k-m})$ at the time point $t_{k-m}$, which is prior to the desired time point $t_k$, and the Block(k) at the time point $t_k$. Then the auditor node may generate the common data $CD(t_k)$ with the snapshot $SS(t_{k-m})$ and transaction(s) in Block(k), and verify the common data $CD(t_k)$ with a hash of the common data $H(CD(t_k))$ in Block(k).

In a further alternative embodiment, the auditor node may first obtain the snapshot $SS(t_{k+m})$ at the time point $t_{k+m}$, which is posterior to the desired time point $t_k$, and the Block(k) at the time point $t_k$ and Block(k+m) at the time point $t_{k+m}$. The auditor node may generate the common data $CD(t_k)$ with the snapshot $SS(t_{k+m})$ and transaction(s) in Block(k+m). Then the auditor node may verify the common data $CD(t_k)$ with a hash of the common data $H(CD(t_k))$ in Block(k).

Figure 7:
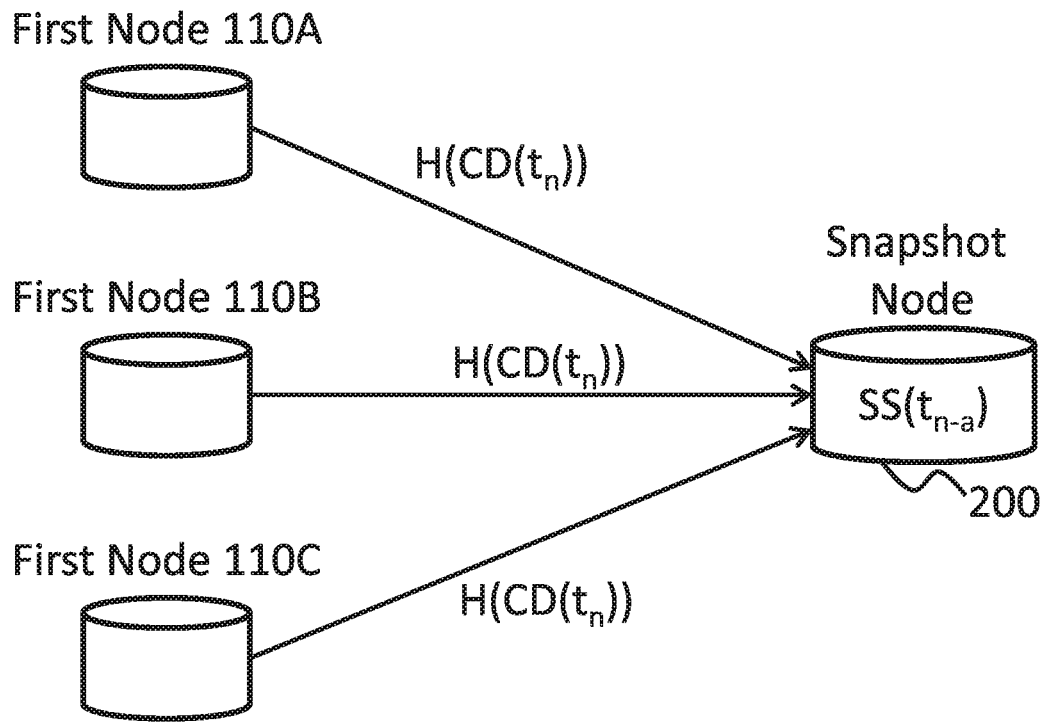
FIG. 7 shows an operation of the snapshot node, according to an embodiment of the present invention.

FIG. 7 shows an operation of the snapshot node 200 obtaining a hash of the common data, such as the operation at S110, according to an embodiment of the present invention. In the embodiment of FIG. 7, the snapshot node 200 can store the snapshot $SS(t_{n-a})$ and obtain common data $H(CD(t_n))$ at the time point $t_n$ from First Nodes 110A, 110B, and 110C of the first node pool at S110. The snapshot node 200 can then verify these $H(CD(t_n))$ from the three first nodes (110A-110C).

Figure 8:
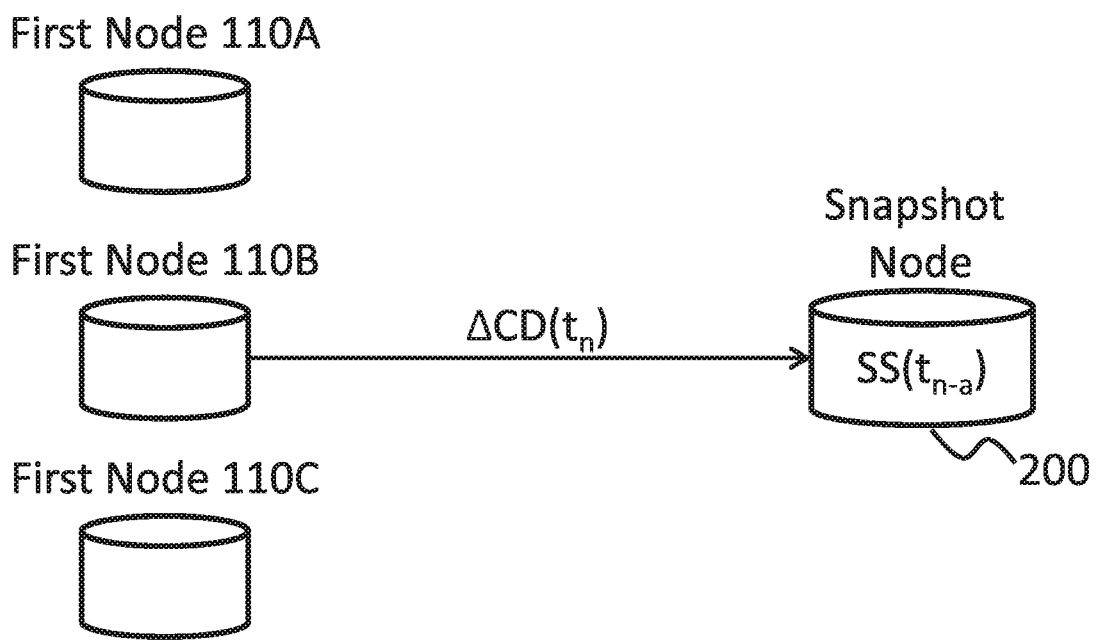
FIG. 8 shows an operation of the snapshot node, according to an embodiment of the present invention.

FIG. 8 shows an operation of the snapshot node 200 obtaining a difference in the common data, such as the operation at S150, according to an embodiment of the present invention. In the embodiment of FIG. 8, the snapshot node 200 may obtain a difference $\Delta CD(t_n)$ from First Node 110B among the first node pool 100. The snapshot node 200 may generate a snapshot $SS(t_n)$ based on a snapshot $SS(t_{n-a})$ and the difference $\Delta CD(t_n)$.

Figure 9:
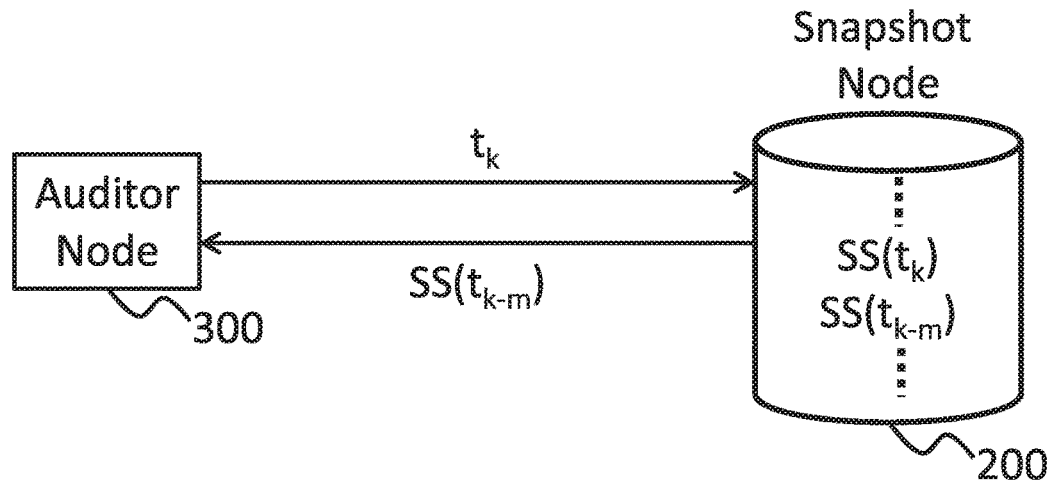
FIG. 9 shows an operation of the auditor node, according to an embodiment of the present invention.

FIG. 9 shows an operation of the auditor node 300 receiving a snapshot, such as the operation at S210, according to an embodiment of the present invention. In the embodiment of FIG. 9, the auditor node 300 transmits a time point $t_k$ to the snapshot node 200, and receives the snapshot $SS(t_{k-m})$ from the snapshot node 200. In some embodiments, the snapshot node 200 may directly provide the snapshot $SS(t_k)$ at the required time point $t_k$.

Figure 10:
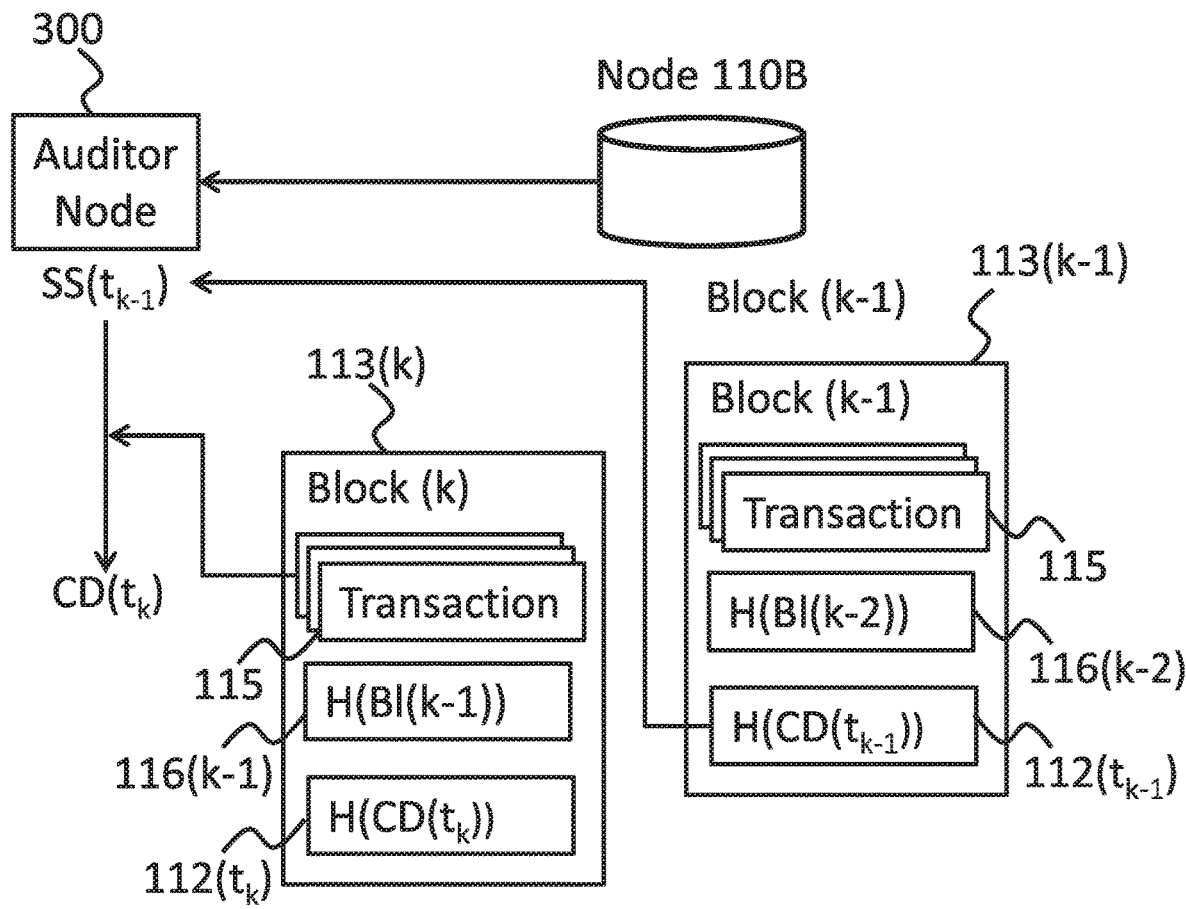
FIG. 10 shows operations of the auditor node, according to an embodiment of the present invention.

FIG. 10 shows operations of the auditor node 300 performing the remaining operations of an audit, such as the operations at S220-290, according to an embodiment of the present invention. In the embodiment of FIG. 10, the auditor node 300 may receive a Block(k-1) and a Block(k) from First Node 110B among the first node pool 100.

The Block(k-1) includes a hash of the common data $H(CD(t_{k-1}))$ at $t_{k-1}$, a hash of the previous Block(k-2), and transactions between the time points $t_{k-2}$ and $t_{k-1}$. The Block(k) includes a hash of the common data $H(CD(t_k))$ at the time point $t_k$, a hash of the previous Block(k-1), and transactions between the time points $t_{k-1}$ and $t_k$.

The auditor node 300 verifies the snapshot $SS(t_{k-1})$ with the hash of the common data $H(CD(t_{k-1}))$ in Block(k-1). The auditor node 300 generates a common data $(CD(t_k))$ at the time point $t_k$ from the snapshot $SS(t_{k-1})$ and the transactions between the time points $t_k$ and $t_{k-1}$ in Block(k).

Figure 11:
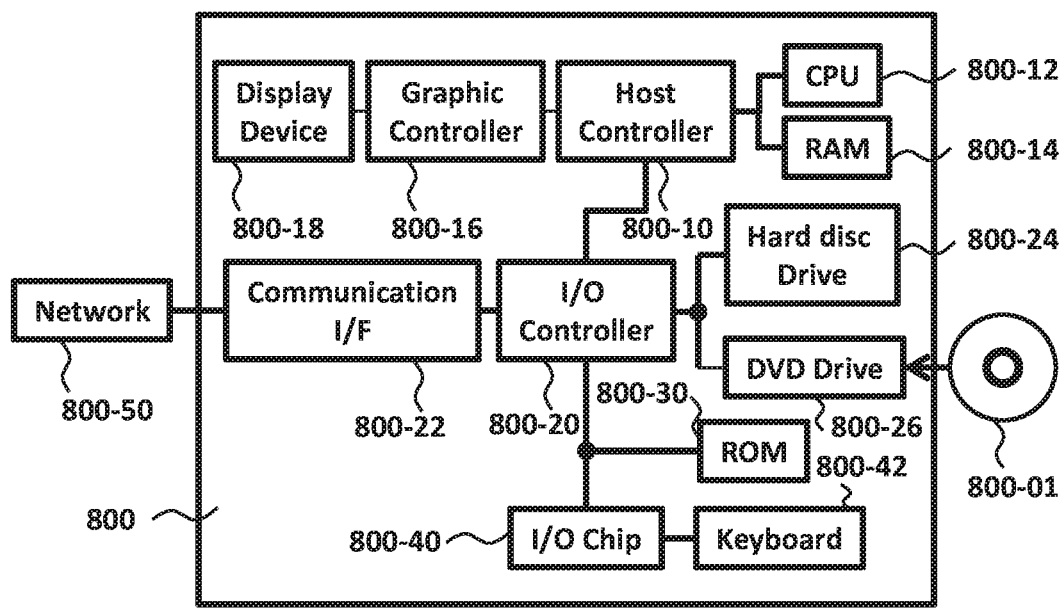
FIG. 11 shows an exemplary hardware configuration of a computer that functions as a system, according to an embodiment of the present invention.

FIG. 11 shows an exemplary hardware configuration of a computer configured for cloud service utilization, according to an embodiment of the present invention. A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program may be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, and a display device 800-18, which are mutually connected by a host controller 800-10. The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 may also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method may be constituted by realizing the operation or processing of information in accordance with the usage of the computer 800.

For example, when communication is performed between the computer 800 and an external device, the CPU 800-12 may execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 may cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 may then write back the processed data to the external recording medium.

Various types of information, such as various types of programs, data, tables, and databases, may be stored in the recording medium to undergo information processing. The CPU 800-12 may perform various types of processing on the data read from the RAM 800-14, which includes various types of operations, processing of information, condition judging, conditional branch, unconditional branch, search/replace of information, etc., as described throughout this disclosure and designated by an instruction sequence of programs, and writes the result back to the RAM 800-14.

In addition, the CPU 800-12 may search for information in a file, a database, etc., in the recording medium. For example, when a plurality of entries, each having an attribute value of a first attribute is associated with an attribute value of a second attribute, are stored in the recording medium, the CPU 800-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention enable a learning apparatus learning a model corresponding to time-series input data to have higher expressive ability and learning ability and to perform the learning operation more simply.

What is claimed is:

1. A computer program product having instructions embodied on a non-transitory computer-readable storage medium or programmable circuitry, the instructions executable by a processor or the programmable circuitry, respectively, to cause the processor or the programmable circuitry to perform operations comprising:
  in a ledger system maintaining distributed database information and world state information, verifying common data at a first time point obtained from two or more first nodes of a plurality of first nodes;
  obtaining, from at least one first node of the plurality of first nodes, a difference between the common data at the first time point and the common data at a second time point that is different from the first time point;

after obtaining the difference, generating a first snapshot of the common data at the first time point based on the difference;

obtaining a hash of the common data at the first time point from at least one of the plurality of first nodes; and verifying the first snapshot at the first time point with the hash of the common data at the first time point.

2. The computer program product of claim 1, wherein the operations further comprise storing a plurality of snapshots of the common data at different time points.

3. The computer program product of claim 1, wherein the first snapshot of the common data at the first time point is generated further based on a second snapshot at the second time point.

4. The computer program product of claim 1, wherein the difference is from an update of the common data with at least one common transaction made between the first time point and the second time point.

5. The computer program product of claim 1, wherein the first time point is a latest time point.

6. The computer program product of claim 1, wherein verifying the first snapshot at the first time point further includes:

calculating a hash of the first snapshot of the common data at the first time point; and determining that the hash of the first snapshot is the same as the hash of the common data at the first time point.

7. The computer program product of claim 6, wherein the operations further comprise:

storing the first snapshot of the common data at the first time point in response to determining that the hash of the first snapshot is the same as the hash of the common data at the first time point.

8. The computer program product of claim 6, wherein the operations further comprise:

obtaining, from at least another first node from the plurality of first nodes, a difference between the common data at the first time point and the common data at the second time point in response to determining that the hash of the first snapshot is not the same as the hash of the common data at the first time point.

9. The computer program product of claim 1, wherein verifying the common data at the first time point further comprises determining whether a plurality of hashes of the common data at the first time point are the same.

10. The computer program product of claim 1, wherein obtaining the hash of the common data at the first time point from the at least one first node from the plurality of first nodes includes obtaining the hash of the common data at the first time point on which a consensus is built by the plurality of first nodes.

11. A system comprising:
a ledger system having:
at least one database for maintaining distributed database information and world state information;
a plurality of first nodes; and
a snapshot node including a processor or programmable circuitry executing instructions embodied in a memory device configured to:
verify common data a first time point obtained from two or more first nodes of a plurality of first nodes;
obtain, from at least one first node of the plurality of first nodes, a difference between the common data at the first time point and the common data at a second time point that is different from the first time point;
after the difference is obtained, generate a first snapshot of the common data at the first time point based on the difference;
obtain a hash of the common data at the first time point from at least one of the plurality of first nodes; and
verify the first snapshot at the first time point with the hash of the common data at the first time point.

12. The system of claim 11, further comprising a memory for storing a plurality of snapshots of the common data at different time points.

13. The system of claim 11, wherein the plurality of first nodes are collectively configured to:
store the common data; and
update the common data with common transactions.

14. The computer program product of claim 1, wherein obtaining the difference further includes obtaining one or more transactions that have occurred between the first time point and the second time point.

15. The system of claim 12, wherein the snapshot node is further configured to obtain the difference by obtaining one or more transactions that have occurred between the first time point and the second time point.

16. The system of claim 12, wherein:
the snapshot node is further configured to verify the first snapshot by:
calculating a hash of the first snapshot of the common data at the first time point; and
determining that the hash of the first snapshot is the same as the hash of the common data at the first time point; and
the snapshot node is further configured to:
store the first snapshot of the common data at the first time point; and
obtain, from at least another first node from the plurality of first nodes, a difference between the common data at the first time point and the common data at the second time point.

* * * * *